(12) United States Patent
Berezny

(10) Patent No.: US 7,258,357 B1
(45) Date of Patent: Aug. 21, 2007

(54) MOTORCYCLE SAFETY SADDLE

(76) Inventor: Thomas J. Berezny, 23 Springtown Rd., Washington, NJ (US) 07882

( * ) Notice: Subject to any disclaimer, the term of this patent is extended or adjusted under 35 U.S.C. 154(b) by 187 days.

(21) Appl. No.: 11/041,686

(22) Filed: Jan. 21, 2005

(51) Int. Cl.
B62K 21/26 (2006.01)
(52) U.S. Cl. ............................... 280/288.4; 280/304.3
(58) Field of Classification Search ............ 280/288.4, 280/304.3, 304.4
See application file for complete search history.

(56) References Cited

U.S. PATENT DOCUMENTS

| 3,940,166 A | 2/1976 | Smithea |
| 4,028,742 A | 6/1977 | Marquis |
| 4,056,268 A | 11/1977 | Connor et al. |
| 4,111,448 A | 9/1978 | Sklodowsky |
| 4,359,233 A | 11/1982 | Jackson et al. |
| 5,002,149 A | 3/1991 | Watanabe et al. |
| 6,896,279 B2 * | 5/2005 | Galvagno ................ 280/304.5 |

FOREIGN PATENT DOCUMENTS

EP 1369346 A2 * 12/2003

* cited by examiner

Primary Examiner—Kevin Hurley

(57) ABSTRACT

A motorcycle safety saddle having a fuel tank protector and a handle. The fuel tank protector protects and cushions the fuel tank, and is shaped to fit a wide variety of motorcycles. The safety saddle defines a cutout area therein, and the cutout area is aligned over the motorcycle tank gas cap to provide access thereto. The motorcycle safety saddle has particular utility in connection with providing motorcycle gasoline tank protection along with an integrated handle for use by a passenger. The handle provides improved stability, control, and safety for a passenger riding behind a motorcycle operator.

6 Claims, 4 Drawing Sheets

MOTORCYCLE SAFETY SADDLE

BACKGROUND OF THE INVENTION

1. Field of the Invention

The present invention relates to a motorcycle safety saddle for use in connection with motorcycle riding, and more particularly pertains to a combined motorcycle fuel tank protector and associated safety handle for use by a passenger on the motorcycle.

2. Description of the Prior Art

There are many published United States patents which illustrate a multitude of motorcycles and the accessories associated therewith, and a number of such patents have been carefully reviewed and analyzed to assist in determining the novelty of the present invention. In this respect, U.S. Pat. No. 5,002,149 to Watanabe et al., which is illustrative of the patents reviewed, discloses a typical patent directed to the overall structure of a motorcycle.

Similarly, U.S. Pat. No. 4,359,233 to Jackson et al. discloses a typical patent directed to a motorcycle accessory, and more particularly to a motorcycle tank bag mounting arrangement. Another patent which was reviewed was U.S. Pat. No. 4,056,268 to Connor et al. and is of interest as disclosing an apparatus for a motorcycle polo game.

Other patents of general relevance include U.S. Pat. No. 3,940,166 to Smith which discloses an auxiliary retention belt and support cushion for seats of open vehicles, and U.S. Pat. No. 4,028,742 to Marquis which discloses a motorcycle safety belt. Lastly, U.S. Pat. No. 4,111,448 to Sklodowsky discloses a motorcycle passenger support.

While the above-described patented devices fulfill their respective, particular objectives and requirements, none of the aforementioned patents describe a motorcycle safety saddle that is designed to protectively cushion a fuel tank and also includes an integrated safety handle for use by a passenger. Accordingly, it seems apparent that a need exists for a new and improved motorcycle fuel tank protector that can be used to both protect a fuel tank and also to provide a safety handle for a passenger. In this respect, the present invention substantially fulfills this need.

SUMMARY OF THE INVENTION

The general purpose of the present invention, which will be described subsequently in greater detail, is to provide a new and improved motorcycle safety saddle which has all the advantages of the prior art devices and structures mentioned heretofore and many novel features not disclosed in the prior art, whereby there is disclosed a motorcycle safety saddle which is not anticipated, rendered obvious, suggested, or even implied by the prior art, either alone or in any combination thereof.

To attain this purpose, the several disclosed embodiments of the present invention essentially describe a motorcycle safety saddle consisting of a fuel tank protector having a handle structure connected thereto, one or more straps connected to the tank protector, and a plurality of different attachment arrangements for connecting the tank protector to a motorcycle.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred embodiments of the invention when taken in conjunction with the accompanying drawings. In this respect, before explaining the current embodiments of the invention in detail, it is to be understood that the invention is not limited in its application to the details of construction and to the arrangements of the components set forth in the following description or illustrated in the drawings. To the contrary, the invention is capable of other embodiments and of being practiced and carried out in various ways not discussed herein. Also, it is to be understood that the phraseology and terminology employed herein are for the purpose of description only and should not be regarded as limiting the scope and intent of the invention.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENTS

Figure 1:
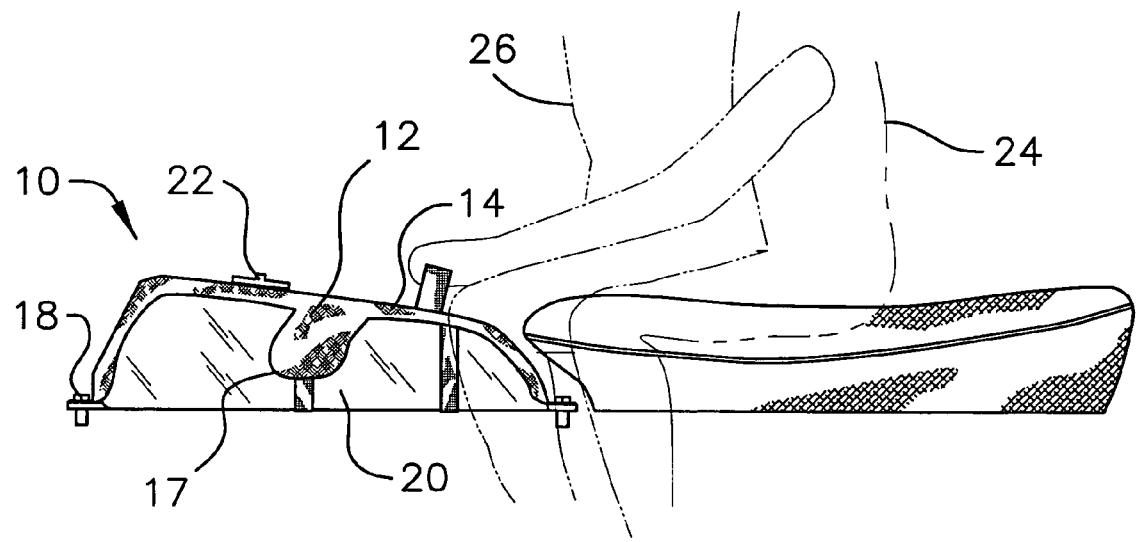
FIG. 1 is a side elevation view of a first embodiment of the motorcycle safety saddle constructed in accordance with the concept of the present invention.

With reference now to the drawings, and in particular to FIGS. 1-4 thereof, a first embodiment of the motorcycle safety saddle comprising the present invention and generally designated by the reference numeral 10 is shown.

More particularly, in this embodiment, it can be seen that the motorcycle safety saddle 10 includes a leather tank protector 12 which partially covers and is removably attached to a conventional motorcycle fuel tank 20. Additionally, a handle structure 14 is illustrated as being attached to and forming a part of the tank protector 12, and a plurality of bolt connection assemblies 18 for connecting the tank protector to a motorcycle are also illustrated. The tank protector 12 includes a cutout 13 therein, and the cutout is adjustably alignable and frictionally engageable with a motorcycle tank gas cap 22. In this embodiment 10 of the invention, it is expected that the tank protector 12 would be custom designed to fit over a particular style and shape of fuel tank 20, whereby the cutout 13 would be snugly positioned around a gas cap 22. As such, the cutout 13 would function as a first means of attachment for securing the tank protector 12 over a motorcycle fuel tank 20.

Figure 2:
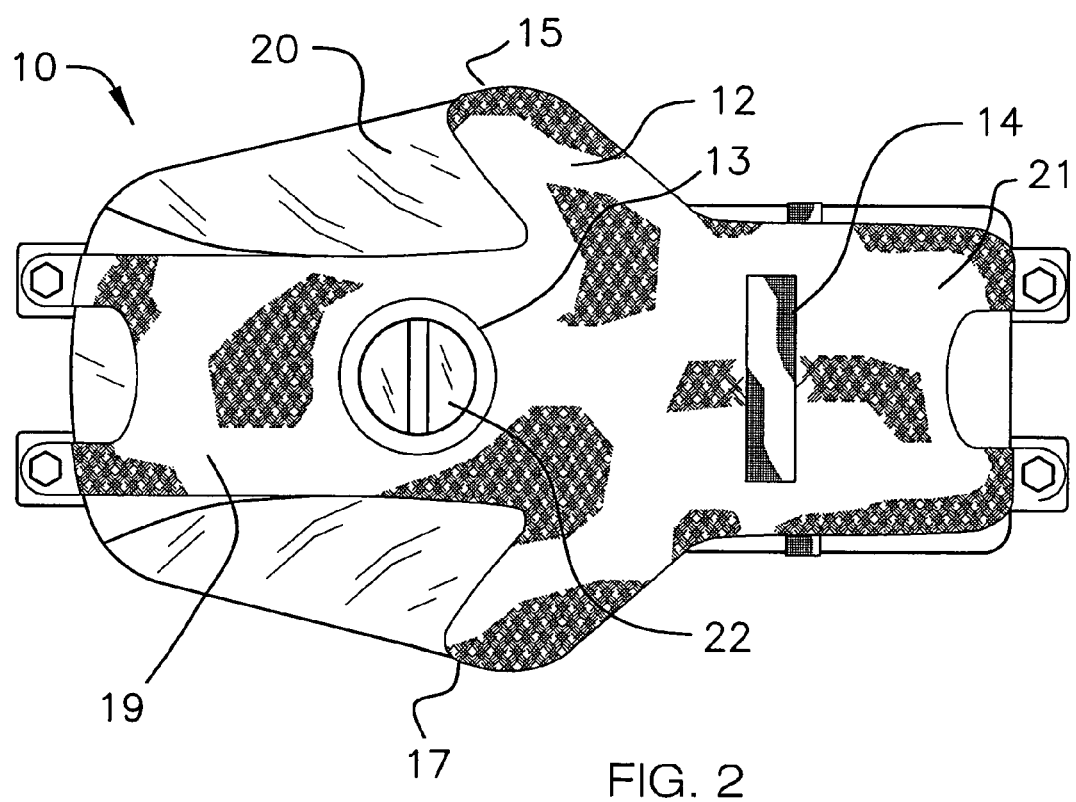
FIG. 2 is a top plan view of the first embodiment of the invention.

As best illustrated in FIGS. 1 and 2, the aforementioned handle structure 14 can be integrally or otherwise conventionally attached to a top surface of the tank protector 12. In the embodiment 10, the handle structure 14 is of a single loop structure and is oriented along an axis orthogonal to the longitudinal axis of a motorcycle when the protector 12 is operably connected to the motorcycle's fuel tank 20. The handle structure 14 is designed to be grasped by one or both hands of a motorcycle passenger 24, and it provides improved stability, control, and safety for the passenger when he or she is positioned behind a motorcycle operator 26.

FIG. 2 further illustrates the fact that the tank protector 12 is of an elongated shape and includes oppositely-disposed, integral members 15, 17 which are designed to decoratively and protectively overlie side sections of a fuel tank 20. These members 15, 17 are designed to insulate a motorcycle fuel tank during contact by objects, such as the routine contact made when mounting a motorcycle or contact from objects such as tools or debris that could otherwise scratch the tank. The protection members 15, 17 could prevent dents or scratches during such contact.

Figure 3:
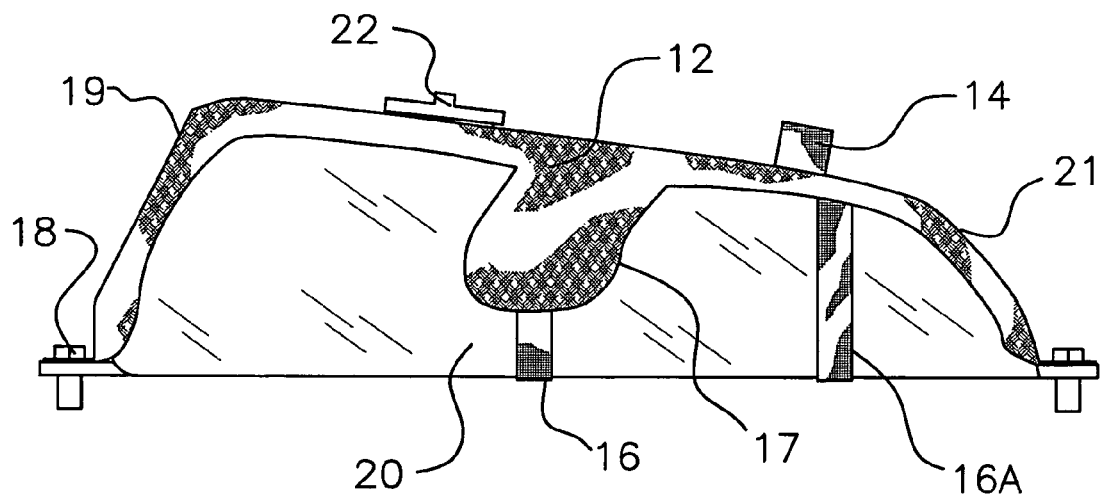
FIG. 3 is an enlarged side elevational view of the first embodiment of the invention.
Figure 4:
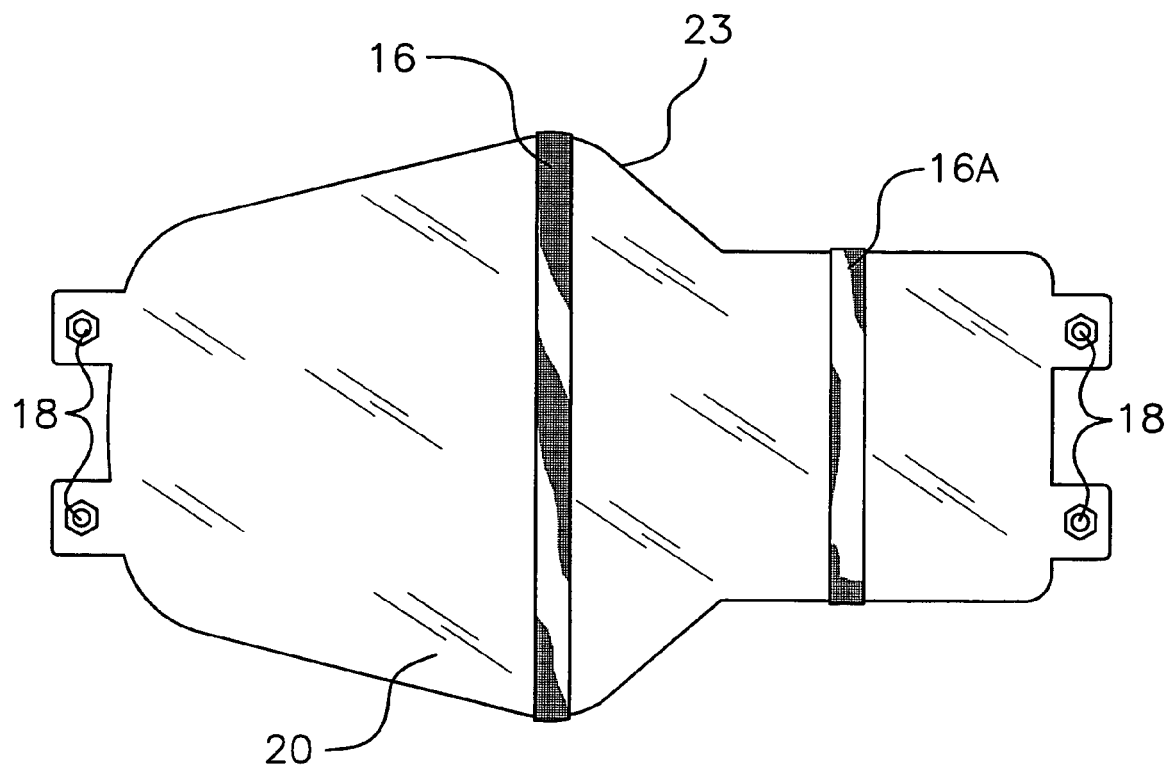
FIG. 4 is a bottom plan view of the first embodiment of the present invention.

FIGS. 2, 3 and 4 also illustrate the integral construction of a flexible forward support member 19 and an oppositely disposed, axially aligned flexible rear support member 21 as a part of the tank protector 12, with a pair of bolt connection assemblies 18 being attached to each of these flexible support members at opposed ends thereof. The forward and rear support members 19, 21 are designed to further facilitate a conforming fit of the tank protector 12 to a motorcycle fuel tank 20, and also to respectively serve as second and third means of attachment since the bolt assemblies 18 are a part of each of these support members. In this regard, the bolt assemblies 18 are illustrative of various known connection assemblies which could be used to securely fasten the tank protector to the frame of a motorcycle, and accordingly, the use of bolts per se is illustrative only, and is not intended to limit the structure of the safety saddle to any particular attachment assembly.

FIGS. 3 and 4 further illustrate the use of securement straps 16, 16A. The strap 16 can employ any known type of adjustable release and connection structure, or in the alternative could be of a continuous stretchable fabric structure, and accordingly, no particular structural limitation, such as a buckle or the like, is illustrated. The strap 16 has its respective ends secured to the opposed ends of the protection members 15, 17, and this strap serves as a fourth means of attachment of the tank protector 12 to a fuel tank 20.

While strap 16 is designed to be fastened around a fuel tank 20 forwardly of a maximum width section 23 of the fuel tank, strap 16A is designed to be positioned around the tank at the opposite side of such maximum width tank section. Thus, strap 16A, which also employs known adjustable release means, such as buckles, velcro, stretchable fabric, etc., serves as a fifth attachment means for securing the tank protector 12 to a fuel tank, and also operably cooperates with strap 16 to prevent forward and aft axial movement of the tank protector over the fuel tank. More specifically, with straps 16 and 16A being respectively tightly secured on opposite sides of the maximum width section 23 of a fuel tank 20, it can be seen that strap 16 prevents rearward movement of the tank protector 12, while strap 16A similarly restricts forward movement of the protector. As such, the cooperable interaction and connection of straps 16, 16A may serve as a sixth attachment means for securing the tank protector 12 to the fuel tank 20.

Figure 5:
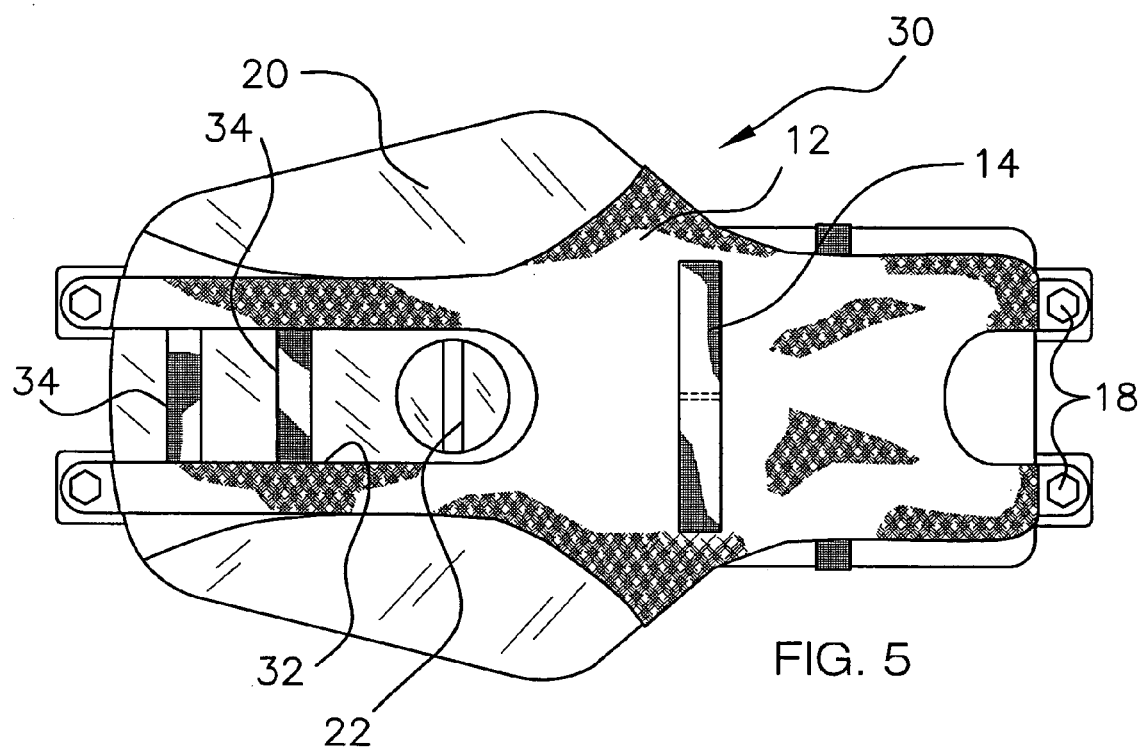
FIG. 5 is a top plan view of a second embodiment of the motorcycle safety saddle forming the present invention.

FIG. 5 is a top plan view of a second embodiment of the safety saddle wherein this embodiment is generally designated by the reference numeral 30. In this embodiment 30, the cutout 13 as shown in embodiment 10 has been replaced by an elongated cutout 32. This elongated cutout 32 allows for a more flexible fit to different types and shapes of motorcycle fuel tanks 20, and could eliminate some of the expense of manufacturing a safety saddle 10 customized for a specific make or model of motorcycle. To facilitate a better and more conforming fit of this embodiment 30 of the invention, one or more cross-extending connection straps 34 could be employed to securely position the forward member 19 against the tank 20. These cross-extending straps 34 serve as a seventh means of attachment of the tank protector 12 to a fuel tank 20.

Figure 6:
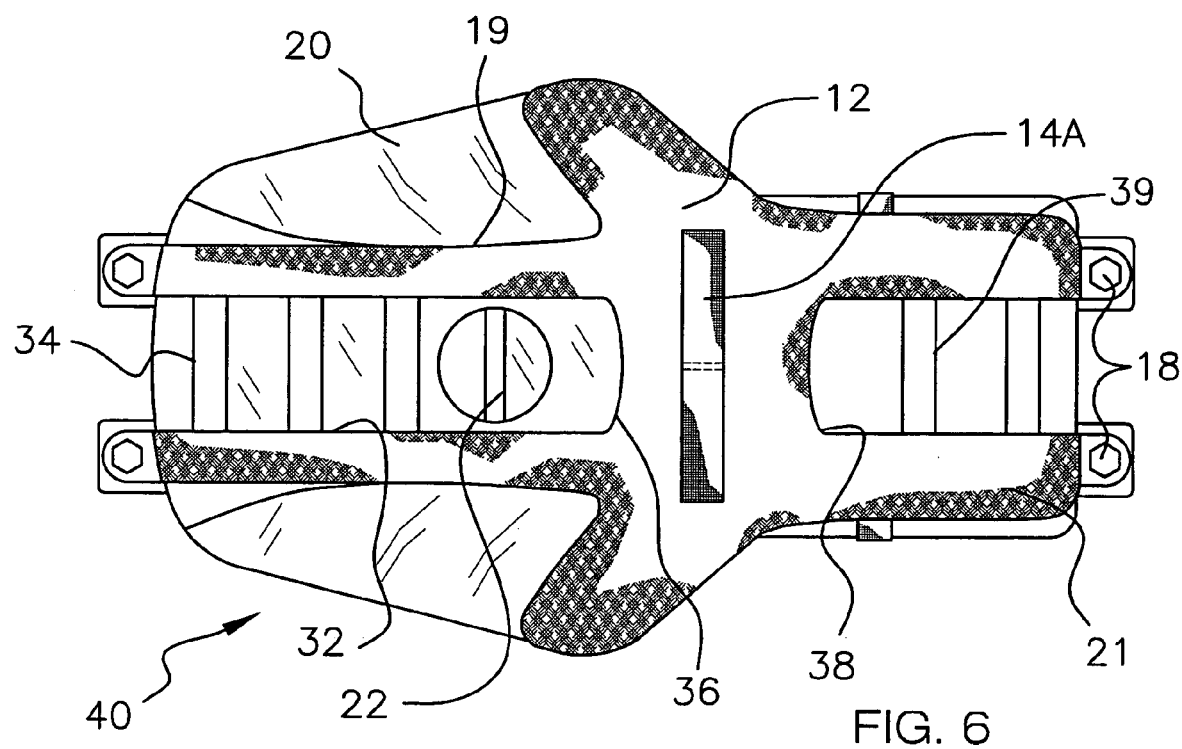
FIG. 6 is a top plan view of a third embodiment of the present invention.

FIG. 6 illustrates a third embodiment of the safety saddle wherein this embodiment is generally designated by the reference numeral 40. This embodiment 40 illustrates even a more generic structure of the safety saddle wherein it could be more easily attached to virtually any shape and size of fuel tank 20. To accomplish this, the embodiment 40 employs the aforedescribed forward cutout 32 with an extended oblique cutout section 36 whereby the gas cap 22 would not contact axially aligned parts of the cutout, although it would still potentially contact side portions of the cutout. This elongated cutout structure 36 would facilitate a more forgiving alignment of the tank protector 12 with a fuel tank 20. Additionally, a second elongated cutout 38 is now illustrated on the rear support member 21 in the event that a fuel cap 22 might be rearwardly positioned on a fuel tank 20, and one or more cross-extending connection straps 39 could be employed to strengthen the connection of the rear support member to a tank. These rearwardly positioned cross-extending connection straps 39 serve as an eighth means of attachment of a tank protector 12 to a motorcycle fuel tank 20.

Figure 7:
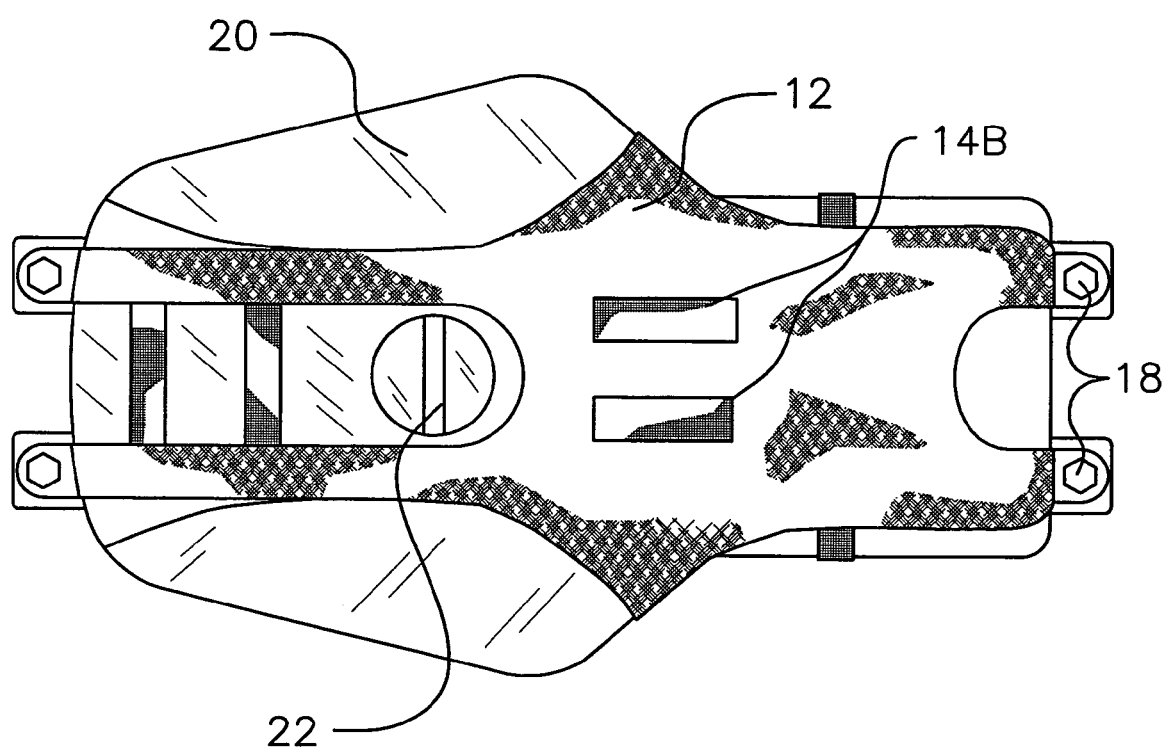
FIG. 7 is a top plan view of the second embodiment of the invention wherein a modified handle structure is illustrated.

As also shown in FIG. 6, the handle structure 14A can be modified to a bifurcated structure so as to provide a distinct spot for each hand of a passenger 24. This variation 14A of the handle structure is illustrative of the various designs of handles which could be used with the various embodiments of the safety saddle 10, and accordingly all such known handle configurations are within the intent and purview of the present application. Along this line of reasoning, FIG. 7 illustrates a modified handle structure 14B wherein two handles are attached in vertical alignment on the tank protector 12, and these handles could be connected to the tank protector by swiveling means to provide even greater versatility and functionality of use.

As can now be appreciated, in its different embodiments, the motorcycle safety saddle 10 comprises quality leather tank protectors in different sizes and styles to accommodate different types of motorcycles, such as a leather model that stretches around the tank base, and a model that is directed up and over the top with a precisely positioned hole for the gas filler cap 22. The attractively styled leather protector may also have a ladder-like shape directed up over the top of the tank, or a smaller ladder-like shape that includes a larger bottom front section with rounded edges.

In use, it can now be understood that the motorcycle safety saddle of the present invention has particular utility in connection with providing an integrated safety handle for use by a passenger along with motorcycle tank protection.

While a preferred embodiment of the motorcycle safety saddle has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, the handle may be bifurcated or split into two components, and oriented in different directions. Additionally, any suitable material such as natural or synthetic fabric, vinyl, or similar material may be used instead of the leather described. Also, the safety handgrip may be made of any sturdy heavy-duty material such as leather, fabric, vinyl, plastic, wood, metal, composite material, or similar material. And although providing motorcycle tank protection along with integrated safety handle for use by a passenger has been described, it should be appreciated that the motorcycle safety saddle herein described is also suitable for other types of vehicles, such as ATV'S, snowmobiles and watercraft. Furthermore, a wide variety of attachments may be used instead of the straps described. In addition, it is to be understood that the various described embodiments may be combined.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A motorcycle safety saddle, comprising:
   a fuel tank protector operably attachable to a motorcycle fuel tank, wherein said fuel tank protector is designed to protectively cover and cushion said motorcycle fuel tank;
   a handle structure connected to said fuel tank protector; wherein said handle structure is designed to be supportively grasped by a motorcycle passenger positioned behind a motorcycle operator;
   a second means of attachment for securing said fuel tank protector to said fuel tank, said second means of attachment comprising a forward support member integrally a part of said tank protector, said forward support member including a first connection assembly for operably attaching said tank protector to a structural component of said motorcycle; and
   a third means of attachment for securing said fuel tank protector to said fuel tank, said third means of attachment comprising a rear support member integrally a part of said tank protector, said rear support member including a second connection assembly for operably attaching said tank protector to a structural component of said motorcycle.

2. The motorcycle safety saddle as described in claim 1 and further comprising a fourth means of attachment for securing said fuel tank protector to said fuel tank, said fourth means of attachment comprising a first securement strap operably attached to said tank protector, said first securement strap being adjustably releasably connectable to said fuel tank.

3. The motorcycle safety saddle as described in claim 2 and further comprising a fifth means of attachment for securing said fuel tank protector to said fuel tank, said fifth means of attachment comprising a second securement strap operably attached to said tank protector, said second securement strap being adjustably releasably connectable to said fuel tank.

4. The motorcycle safety saddle as described in claim 3 and further comprising a sixth means of attachment for securing said fuel tank protector to said fuel tank, said sixth means of attachment comprising a positioning of said first and second securement straps respectively on opposed sides of a maximum width section of said fuel tank, thereby to prevent forward and aft axial movement of said tank protector.

5. The motorcycle safety saddle as described in claim 4 and further comprising a seventh means of attachment for securing said fuel tank protector to said fuel tank, said seventh means of attachment comprising at least one first cross-extending strap on one of said forward and rear support members.

6. The motorcycle safety saddle as described in claim 5, and further comprising an eighth means of attachment for securing said fuel tank protector to said fuel tank, said eighth means of attachment comprising at least one second cross-extending strap on a remaining one of said forward and rear support members.

\* \* \* \* \*